(12) United States Patent
Streit et al.

(10) Patent No.: US 12,223,332 B2
(45) Date of Patent: Feb. 11, 2025

(54) METHOD FOR STARTING-UP A DEVICE WITH AN EMBEDDED MULTIMEDIA CARD (eMMC)

(71) Applicant: Continental Automotive GmbH, Hannover (DE)

(72) Inventors: Alexander Streit, Offenbach (DE); Klaus Toscher, Solms (DE); Andreas Weiss, Netphen (DE)

(73) Assignee: Continental Automotive GmbH, Hannover (DE)

( * ) Notice: Subject to any disclaimer, the term of this patent is extended or adjusted under 35 U.S.C. 154(b) by 67 days.

(21) Appl. No.: 17/764,061

(22) PCT Filed: Sep. 25, 2020

(86) PCT No.: PCT/EP2020/076968
§ 371 (c)(1),
(2) Date: Mar. 25, 2022

(87) PCT Pub. No.: WO2021/058777
PCT Pub. Date: Apr. 1, 2021

(65) Prior Publication Data
US 2022/0342675 A1 Oct. 27, 2022

(30) Foreign Application Priority Data
Sep. 27, 2019 (DE) .................. 10 2019 214 835.2

(51) Int. Cl.
*G06F 9/4401* (2018.01)
(52) U.S. Cl.
CPC ................ *G06F 9/4406* (2013.01)

(58) Field of Classification Search
None
See application file for complete search history.

(56) References Cited

U.S. PATENT DOCUMENTS

2007/0168652 A1  7/2007 Mylly et al.
2007/0174602 A1*  7/2007 Kao .................. G06F 9/4403
                                                        713/2

(Continued)

FOREIGN PATENT DOCUMENTS

CN   101751270 A   6/2010
CN   102200923 A   9/2011

(Continued)

OTHER PUBLICATIONS

"Embedded Multimedia Card eMMC, Electrical Standard 4.51, JESD84-B451", Jun. 1, 2012, XP055227468, Retrieved from the Internet: URL:http:www.jedec.org/sites/default/filers/docs/JESD84-B451.pdf [retrieved on Nov. 10, 2015] the whole document in particular chapter 6.3 Boot Operation Mode.

(Continued)

*Primary Examiner* — Fahmida Rahman

(57) ABSTRACT

A method for starting-up a device with an embedded multimedia card (eMMC) is provided. The method comprises providing power to the device, putting the eMMC in a Fast-Boot modus, reading a bootloader from the eMMC into a RAM of the device, starting the bootloader in a CPU of the device, terminating the Fast-Boot modus, resetting the eMMC, putting the eMMC in the Fast-Boot modus initializing hardware by the bootloader, while reading an operating system into the RAM using DMA, and starting the operating system from the RAM by the bootloader is provided. A device comprising an embedded eMMC is also disclosed.

7 Claims, 2 Drawing Sheets

(56) References Cited

U.S. PATENT DOCUMENTS

2015/0082015 A1 3/2015 Chen et al.
2019/0056879 A1* 2/2019 Hudson .................... G11C 7/20

FOREIGN PATENT DOCUMENTS

| CN | 103491248 A | 1/2014 |
| CN | 104375871 A | 2/2015 |
| CN | 109308195 A | 2/2019 |
| KR | 20140121233 A | 10/2014 |

OTHER PUBLICATIONS

International Search Report and Written Opinion dated Jan. 14, 2021 from corresponding International patent application No. PCT/EP2020/076968.
Office Action dated Jan. 22, 2024 from corresponding Korean patent application No. 10-2022-7009191.
Office Action dated Feb. 7, 2024 from corresponding Chinese patent application No. 202080067357.5.
Notice of Allowance issued on Nov. 1, 2014 from corresponding Korean patent application No. 10-2022-7009191.

\* cited by examiner

METHOD FOR STARTING-UP A DEVICE WITH AN EMBEDDED MULTIMEDIA CARD (eMMC)

CROSS REFERENCE TO RELATED APPLICATIONS

This U.S. patent application claims the benefit of PCT patent application No. PCT/EP2020/076968 filed on Sep. 25, 2020, which claims the benefit of German patent application No. 10 2019 214 835.2 filed on Sep. 27, 2019, both of which are hereby incorporated by reference.

TECHNICAL FIELD

The technical field relates to a method for starting-up a device with an embedded multimedia card (eMMC). The technical field further relates to a device comprising an embedded eMMC.

BACKGROUND

Many vehicles have installed devices, such as navigation units or infotainment units, that comprise a central processing unit (CPU) and a memory. Before these devices can be used, an operating system needs to be loaded and started and hardware parts of the device need to be initialized.

Many of these devices comprise an embedded multimedia card (eMMC), which is a flash memory and a controller in an integrated circuit for use in the circuit boards of the device as an embedded non-volatile memory system. The card is permanently attached to the circuit boards and cannot be removed by a user. In case of a problem, the whole printed circuit board needs to be replaced.

The JEDEC standard describes the functionalities of the eMMCs. Among others, it describes the possibility of reducing the start-up time of a device comprising an eMMC, using the so-called Fast Boot Modus, in which the Bootloader is quickly loaded into the memory of the device. Then the Fast Boot Modus is ended, and the operating system is loaded slower into the memory using the normal Standard Boot procedures.

However, it takes some time before the operating system of the device is loaded and started. In some application, such as navigation and/or infotainment devices, this time may exceed the allowed or desired start-up time.

It is therefore an objective of the disclosure to provide a method for starting-up a device with an embedded multimedia card with a reduced start-up time and to provide a device comprising an eMMC with a reduced start-up time.

SUMMARY

This objective is met by a method for starting-up a device with an embedded multimedia card (eMMC) and by a device comprising an embedded multimedia card (eMMC).

According to one aspect, a method for starting-up a device with an embedded multimedia card (eMMC) is provided. The method comprises providing power to device, putting the eMMC in a Fast-Boot modus, reading a bootloader from the eMMC into a Random-Access Memory (RAM) of the device, starting the bootloader in a CPU of the device, terminating Fast-Boot modus, resetting the eMMC, putting the eMMC in the Fast-Boot modus, initializing hardware by the bootloader, while reading an operating system into the RAM using Direct Memory Access (DMA), and starting the operating system from the RAM by the bootloader.

The device with the eMMC may be a navigation device or infotainment device that is installed in a vehicle.

The flash memory of the eMMC may comprise two boot areas and one main data area. The boot areas may be faster readable that the main data area. The main data area may comprise an operating system.

In this method, the step of providing power to the device may comprise switching on the power of the device.

A procedure for starting-up a device with an eMMC known in the art comprises first powering the device and starting it the Fast-Boot modus, then reading a bootloader into the RAM, starting the bootloader in the CPU of the device and terminating Fast-Boot modus. The bootloader will then initialize the hardware and read further an operating system from the main data area in the RAM of the device. After the operating system is loaded in the RAM, the bootloader starts the execution of the operating system.

According to the disclosure, the eMMC is set again in the Fast-Boot modus after the Fast-Boot modus has been terminated. In this Fast-Boot modus, the operating system is loaded in the RAM using Direct Memory Access (DMA), while the bootloader initializes the hardware. Because the operating system is loaded using DMA, the CPU does not take part in this and can be used for other tasks, for example initializing hardware. After the operating system is loaded in the RAM, the bootloader starts the execution of the operating system.

Because the operating system is loaded in the Fast-Boot modus without using the CPU of the device while the hardware is initialized by the bootloader (which uses the CPU of the device), the method for starting-up a device with an eMMC according to the disclosure is faster than the method known in the art.

Since the operating system will have been started faster, it can quicker or earlier respond to external events, such as CAN messages (CAN=Controller Area Network, a known network standard in the automotive industry).

Providing power to the device, putting the eMMC in a Fast-Boot modus, reading the bootloader from the eMMC into the RAM of the device, starting the bootloader in the CPU of the device and/or terminating the Fast-Boot modus may be carried out by the ROM Code that is executed after the switching on the device. Resetting the eMMC and/or putting the eMMC in the Fast-Boot modus may be carried out by the bootloader. In initializing hardware by the bootloader, while reading an operating into the RAM using Direct Memory Access (DMA), it may be the bootloader that instructs an eMMC Controller to read the operating system into the RAM using DMA.

Furthermore, a device comprising an embedded multimedia card (eMMC) is provided, storing a set of controller executable code, which, when executed by said device, performs the steps of a method as described in this document. Also, a vehicle is provided with such a device.

FIGURES

For a more complete understanding of the present disclosure, reference is made to the following description made in connection with accompanying drawings in which.

DETAILED DESCRIPTION

Figure 1:
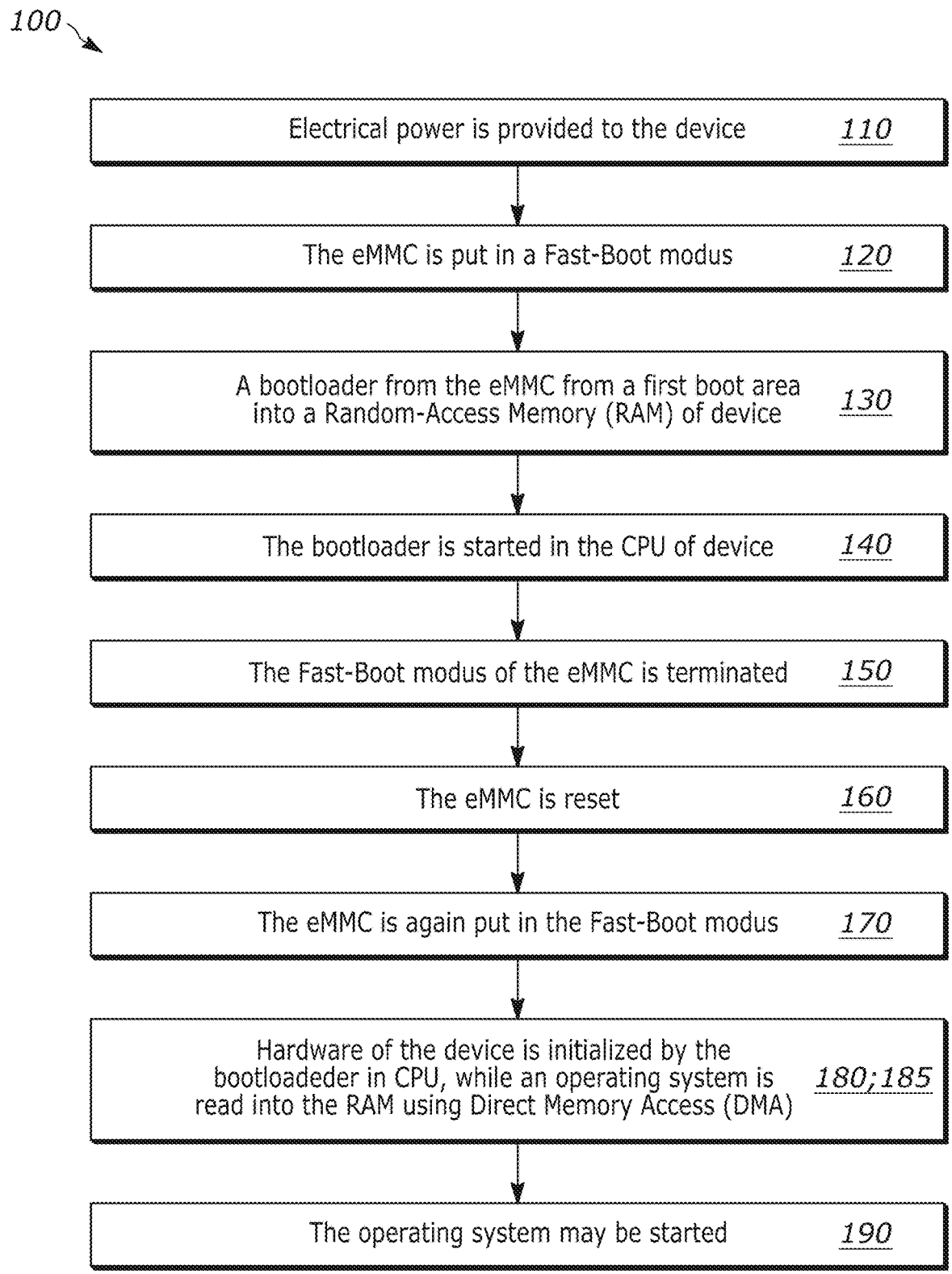
FIG. 1 shows a schematic overview of a method for starting-up a device with an embedded multimedia card (eMMC)
Figure 2:
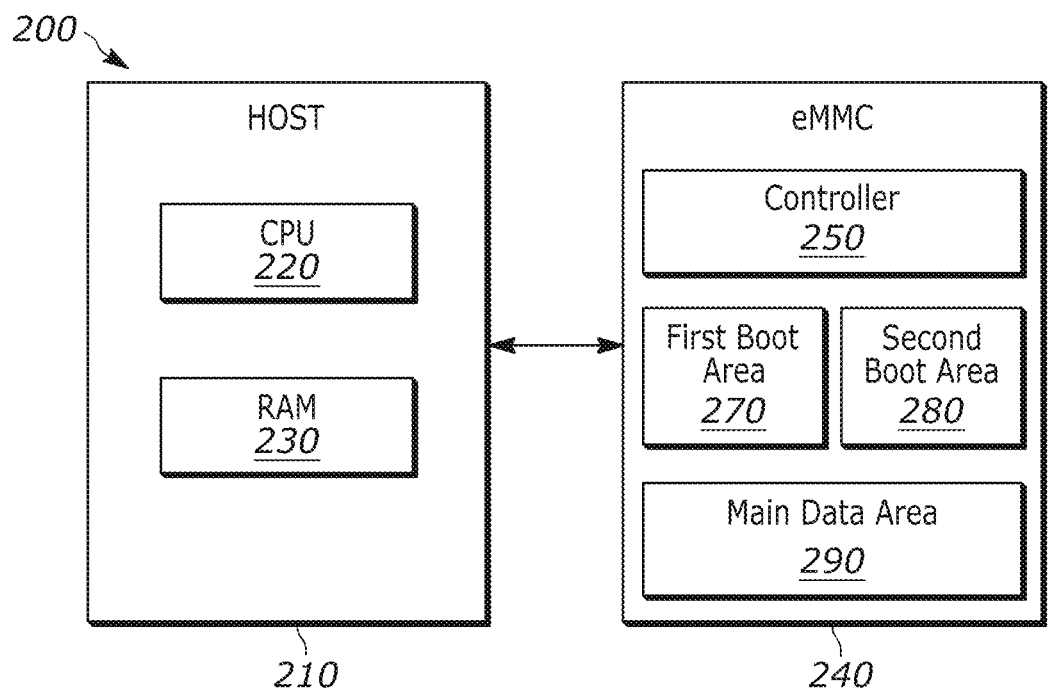
FIG. 2 shows schematic overview of a device with an embedded multimedia card (eMMC)

FIG. 1 shows a schematic overview of method 100 for starting-up a device with an embedded multimedia card (eMMC), while FIG. 2 shows schematic overview of such a device 200, which may comprise an eMMC 240 and a host 210. The eMMC is embedded in the host 210 and the arrow in FIG. 2 indicated the communication between the eMMC 240 and the host 210.

In FIG. 2 only features that relate to the starting-up procedure of the device using the eMMC are depicted. Other features (for example a GPS for determining a position of a vehicle and/or a display for displaying information about said position) have been omitted for clarity reasons.

The eMMC 240 may comprise a first boot area 270, a second boot area 280 and/or a main data area 290. Furthermore, the eMMC may comprise an eMMC controller 250. The host 210 may comprise a central processing unit (CPU) 220 and a RAM 230.

When the power is switched on of the device, electrical power is provided to the device 200 in step 110. In step 120 the eMMC is put in a Fast-Boot modus, preferably according to the JEDEC standard, version 4.51. This may be instructed by a ROM Code of the device that is executed by a CPU 220 of the device 200.

In step 130 a bootloader from said eMMC, for example from first boot area 270, into a Random-Access Memory (RAM) 230 of device 200. This also may be instructed by the ROM Code. In step 140 the bootloader is started in the CPU 220 of device 200, preferably instructed by the ROM Code. Then the Fast-Boot modus of the eMMC is terminated in step 150, preferably instructed by the ROM Code.

In step 160, the eMMC is reset, which is preferably instructed by the ROM Code. And in step 170, the eMMC is again put in the Fast-Boot modus, in this preferably instructed by the bootloader.

In the phase, two steps 180 and 185 are at least partly executed at the same time. In step 180, hardware of the device is initialized by the bootloader in CPU 220, while in step 185 an operating system is read into the RAM 230 using Direct Memory Access (DMA). The CPU 220 may not be involved with reading this data into the RAM using DMA.

It may be that the bootloader instructs an eMMC-controller 250 to transfer the data (an operating system) from the eMMC (preferably from a second boot area 280 and/or a main data area 290) into the RAM 230 using DMA.

When the operating system is loaded into the RAM and the hardware has at least partly been initialized, the operating system may be started in step 190, preferably instructed by the bootloader.

Figure 3:
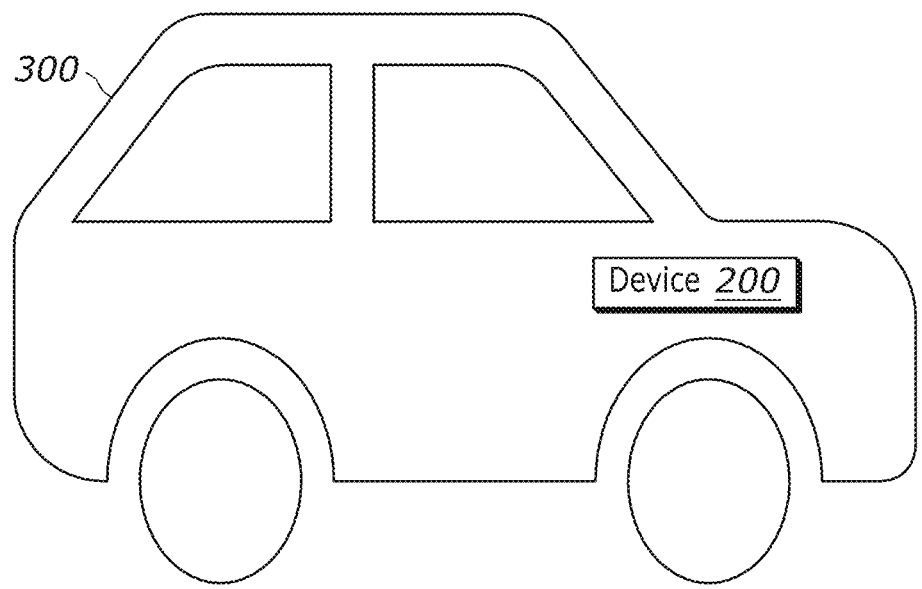
FIG. 3 shows a vehicle with a device with an embedded multimedia card (eMMC).

FIG. 3 shows a vehicle 300 with device 200. The vehicle 300 may be a car, a truck, a bus or any other transport means with an on-board device 200.

While the present disclosure has been described and illustrated in conjunction with a number of specific embodiments, those skilled in the art will appreciate that variations and modifications may be made without departing from the principles of the inventions as herein illustrated, as described and claimed. The described embodiments are considered in all respects to be illustrative and not restrictive. The scope of the disclosure is, therefore, indicated by the appended claims, rather than by the foregoing description. All changes which come within the meaning and range of equivalence of the claims are to be embraced within their scope.

The invention claimed is:

1. A method for starting-up a device with an embedded multimedia card (eMMC), comprising:
   providing power to the device;
   putting the eMMC in a Fast-Boot modus for a first duration;
   reading a bootloader from the eMMC from a first boot area into a Random-Access Memory (RAM) of the device during the Fast-Boot modus for the first duration of the eMMC;
   starting the bootloader in a CPU of the device;
   terminating the Fast-Boot modus after the first duration in response to starting the bootloader;
   resetting the eMMC after the terminating;
   putting the eMMC in the Fast-Boot modus for a second duration after the resetting the eMMC;
   initializing hardware by the bootloader, while reading an operating system into the RAM from a second boot area and/or a main data area using Direct Memory Access (DMA); and
   starting the operating system from the RAM by the bootloader.

2. The method according to claim 1, wherein providing power to the device, putting the eMMC in a Fast-Boot modus for a first duration, reading the bootloader from the eMMC from a first boot area into the RAM of the device during the Fast-Boot modus for the first duration of the eMMC, starting the bootloader in the CPU of the device and/or terminating the Fast-Boot modus after the first duration in response to starting the bootloader are carried out by a ROM Code.

3. The method according to claim 1, wherein resetting the eMMC after the terminating and/or putting the eMMC in the Fast-Boot modus for a second duration after the resetting the eMMC are carried out by the bootloader.

4. The method according to claim 1, wherein in initializing hardware by the bootloader, while reading an operating into the RAM from a second boot area and/or a main data area using DMA, the bootloader instructs an eMMC Controller to read the operating system into the RAM using DMA.

5. A device, comprising:
   an embedded multimedia card (eMMC); and
   a memory,
   wherein a set of controller executable code is stored in the memory, and the set of controller executable code is executed by an eMMC controller to perform operations comprising:
   providing power to the device;
   putting the eMMC in a Fast-Boot modus for a first duration;
   reading a bootloader from the eMMC from a first boot area into the memory of the device during the Fast-Boot for the first duration of the eMMC;
   starting the bootloader in a CPU of the device;
   terminating the Fast-Boot modus after the first duration in response to starting the bootloader;
   resetting the eMMC after the terminating;
   putting the eMMC in the Fast-Boot modus for a second duration after the resetting the eMMC;
   initializing hardware by the bootloader, while reading an operating system into the memory from a second boot area and/or a main data area using Direct Memory Access (DMA); and starting the operating system from the memory by the bootloader.

6. The device according to claim 5, wherein the device is a navigation device or an infotainment device.

7. A device installed in a vehicle, the device comprising:
an embedded multimedia card (eMMC); and
a memory,
wherein a set of controller executable code is stored in the memory, and the set of controller executable code is executed by an eMMC controller to perform operations comprising:
providing power to the device;
putting the eMMC in a Fast-Boot modus for a first duration;
reading a bootloader from the eMMC from a first boot area into the memory of the device during the Fast-Boot for the first duration of the eMMC;
starting the bootloader in a CPU of the device;
terminating the Fast-Boot modus after the first duration in response to starting the bootloader;
resetting the eMMC after the terminating;
putting the eMMC in the Fast-Boot modus for a second duration after the resetting the eMMC;
initializing hardware by the bootloader, while reading an operating system into the memory from a second boot area and/or a main data area using Direct Memory Access (DMA); and
starting the operating system from the memory by the bootloader.

* * * * *